US011036574B2

(12) United States Patent
Agrrawal et al.

(10) Patent No.: US 11,036,574 B2
(45) Date of Patent: *Jun. 15, 2021

(54) RECOVERY OF FIRST FAILURE DATA CAPTURE LOGS

(71) Applicant: International Business Machines Corporation, Armonk, NY (US)

(72) Inventors: Ankur Agrrawal, Bangalore (IN); Karthik Bhat, Bangalore (IN); Clarence D'Mello, Bangalore (IN); Naveen Kumar Hullahalli Rajashekar, Mysore (IN); Muruganandam Somasundaram, Poughkeepsie, NY (US); Martin Taubert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 16/263,127

(22) Filed: Jan. 31, 2019

(65) Prior Publication Data

US 2019/0163554 A1    May 30, 2019

Related U.S. Application Data (63) Continuation of application No. 15/350,600, filed on Nov. 14, 2016, now Pat. No. 10,241,855.

(51) Int. Cl.
*G06F 11/07* (2006.01)

(52) U.S. Cl.
CPC ........ *G06F 11/079* (2013.01); *G06F 11/0775* (2013.01); *G06F 11/0793* (2013.01)

(58) Field of Classification Search
CPC .............. G06F 11/079; G06F 11/0775; G06F 11/0793; G06F 11/1471; G06F 11/1469; G06F 2201/86; G06F 2201/87
See application file for complete search history.

(56) References Cited

U.S. PATENT DOCUMENTS

| 6,601,021 | B2 * | 7/2003 | Card | G06F 3/013 340/3.6 |
| 7,877,360 | B2 * | 1/2011 | Rohit | G06F 11/1471 707/648 |

(Continued)

FOREIGN PATENT DOCUMENTS

KR    101623505 B1    5/2016

OTHER PUBLICATIONS

"Journalctl—verify reports corruption". Unix & Linux Stack Exchange. Edited Aug. 23, 2013 at 14:00.

(Continued)

*Primary Examiner* — Nadeem Iqbal
(74) *Attorney, Agent, or Firm* — Peter J. Hackman; Brian M. Restauro (57) ABSTRACT

An approach for recovering event logs. The approach detects corruption in an event log. The approach determines whether a start pointer in a log buffer header is corrupt. Responsive to a determination that the start pointer is corrupt, the approach recovers the start pointer. The approach determines whether an end pointer in the log buffer header is corrupt. Responsive to a determination that the end pointer is corrupt, the approach recovers the end pointer. The approach determines whether an eye catcher in the log buffer header is corrupt. Responsive to a determination that the eye catcher is corrupt, the approach recovers the eye catcher. The approach presents one or more log entries to a management console.

18 Claims, 3 Drawing Sheets

(56) References Cited

U.S. PATENT DOCUMENTS

| | | |
|---|---|---|
| 8,578,174 B2 | 11/2013 | Jakobsson |
| 10,241,855 B2* | 3/2019 | Agrrawal ............... G06F 11/079 |
| 2002/0091718 A1 | 7/2002 | Bohannon |
| 2012/0078854 A1* | 3/2012 | Bradshaw ........... G06F 16/2308 |
| | | 707/675 |
| 2012/0166743 A1 | 6/2012 | Lewis |

OTHER PUBLICATIONS

Appendix P List of IBM Patents or Applications Treated as Related. Two pages. Dated __Jan. 30, 2019.
Poettering. "F20 System Wide Change: No Default Syslog". Tue Jul. 16 16:09:32 UTC 2013. Two pages.
Schafer. "Why Journald?" Jan. 5, 2016. Nine pages.
Wikipedia "Journaling file systems". Modified on Jul. 21, 2016. Four pages.

* cited by examiner

RECOVERY OF FIRST FAILURE DATA CAPTURE LOGS

BACKGROUND OF THE INVENTION

The present invention relates generally to the field of data recovery, and more particularly to recovery of event log information.

First failure data capture (FFDC) assists administrators with debugging system failures. An event logger records software and hardware actions that occur immediately prior to a failure. The logged information can be invaluable in debugging errors. An error in the log, however, may prevent an administrator from diagnosing the cause of a problem.

SUMMARY

Aspects of an embodiment of the present invention disclose a method, computer program product, and a computer system for recovering event logs. The method may include detecting, by one or more computer processors, corruption in an event log. The method may further include determining, by the one or more computer processors, whether a start pointer in a log buffer header is corrupt. Responsive to a determination that the start pointer is corrupt, the method may further include recovering, by the one or more computer processors, the start pointer. The method may further include determining, by the one or more computer processors, whether an end pointer in the log buffer header is corrupt. Responsive to a determination that the end pointer is corrupt, the method may further include recovering, by the one or more computer processors, the end pointer. The method may further include determining, by the one or more computer processors, whether an eye catcher in the log buffer header is corrupt. Responsive to a determination that the eye catcher is corrupt, the method may further include recovering, by the one or more computer processors, the eye catcher. The method may further include presenting, by the one or more computer processors, one or more event log entries to a management console.

DETAILED DESCRIPTION

Embodiments of the present invention recognize that first failure data capture logs are an invaluable tool in debugging errors in a computer system. Embodiments of the present invention recognize that an administrator can study the events immediately prior to a failure to determine which actions caused the failure. Embodiments of the present invention recognize that errors in the header of an event log can render an otherwise intact event log unreadable.

Embodiments of the present invention provide the capability to reconstruct an event log header without reinitializing the event log. Embodiments of the present invention provide the capability to recover an event log without shutting down the memory on which an event log is stored. Embodiments of the present invention provide the capability to recover event logs where an event log header is corrupt.

Figure 1:
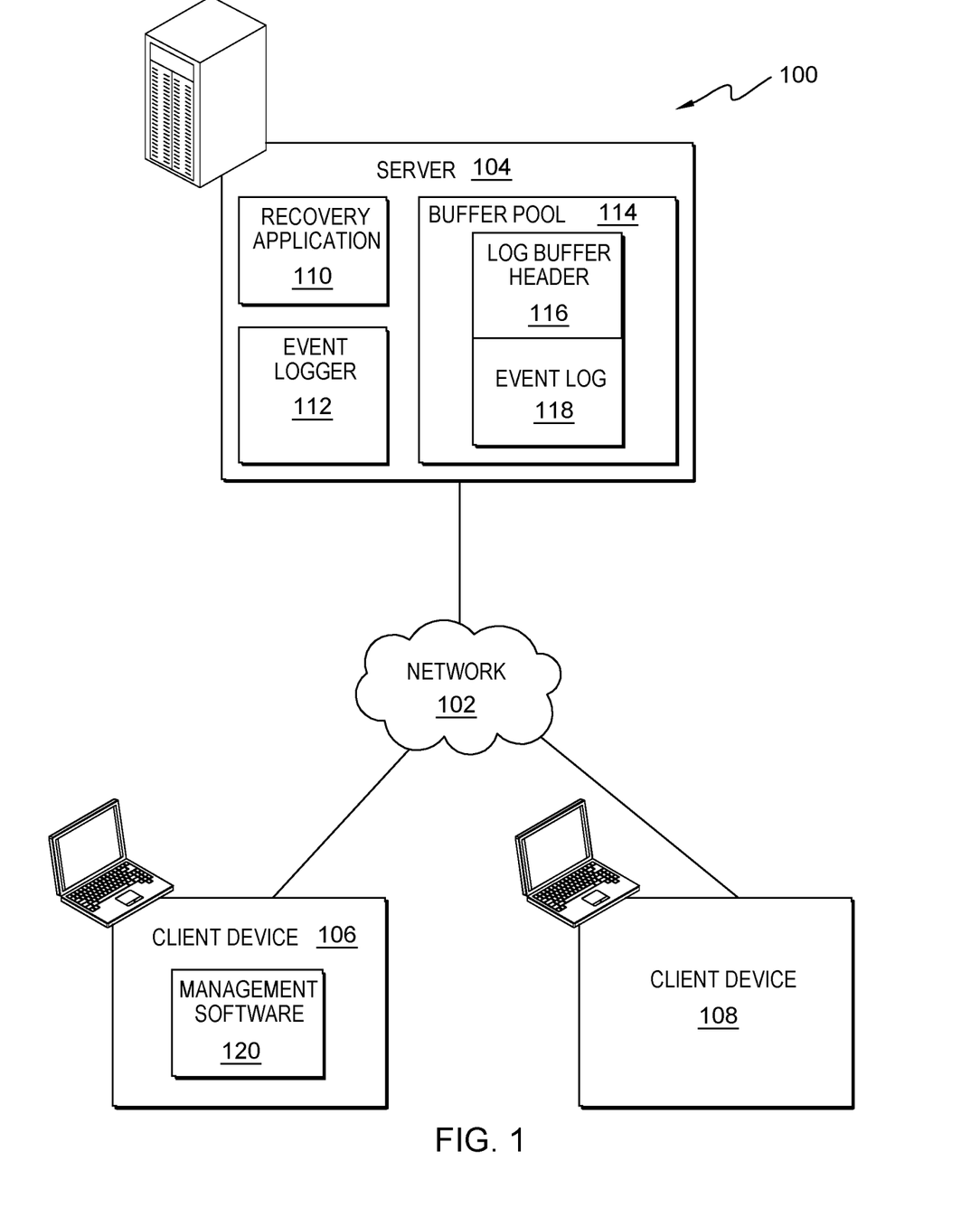
FIG. 1 is a functional block diagram illustrating a distributed data processing environment, in accordance with an embodiment of the present invention.

FIG. 1 is a functional block diagram illustrating a distributed data processing environment, generally designated 100, in accordance with an embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 may include network 102, server 104, client device 106, and client device 108.

Network 102 can be any combination of connections and protocols capable of supporting communications between server 104, client device 106, client device 108, recovery application 110, and management software 120. Network 102 may include wire cables, wireless communication links, fiber optic cables, routers, switches and/or firewalls. Server 104, client device 106, and client device 108 are interconnected by network 102. In one embodiment, network 102 may be the Internet representing a worldwide collection of networks and gateways that use TCP/IP protocols to communicate with one another. In other embodiments, network 102 may be implemented as a number of different types of networks, such as an intranet, a local area network (LAN), a virtual local area network (VLAN), or a wide area network (WAN). FIG. 1 is intended as an example and not as an architectural limitation for the different embodiments.

Server 104 may be a server computer system such as a management server, a web server, or any other electronic device or computing system capable of sending and receiving data. In one embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In some embodiments, server 104 may include recovery application 110, event logger 112, and buffer pool 114.

Client device 106 and client device 108 may be clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 and client device 108 may be a mobile device capable of connecting to a network, such as network 102, to conduct a phone call, access the Internet, or utilize location services (e.g., global positioning systems).

In some embodiments, client device 106 may be a management console. For example, client device 106 may provide administration functions for server 104. In some embodiments, client device 106 may include management software 120. In other embodiments, client device 106 may function as a management console by executing management software 120. For example, client device 106 may become a management console when management software 120 is executed on client device 106.

Recovery application 110 may be a software-based application, operating on a computer system, such as server 104, for recovering a log buffer header where the buffer pool infrastructure is corrupt. Recovery application 110 may detect corruption, recover the log buffer header, and transmit non-corrupt log entries to management software, such as management software 120. The operations performed by recovery application 110 are discussed further in the description of FIG. 2.

Event logger 112 may be a software-based application, operating on a computer system, such as server 104, for recording event information to a log. For example, event logger 112 may receive first failure capture data (FFDC) information, such as error, warning, debug, and trace information, from firmware, software, and hardware connected to server 104. In some embodiments, event logger 112 may write FFDC information to event log 118.

Buffer pool 114 may be volatile memory on server 104, which may receive data from an event logger, such as event logger 112. For example, buffer pool 114 may be a portion of the random access memory (RAM) of server 104, which receives event log entries from event logger 112. In some embodiments, buffer pool 114 may be contained in the shared memory portion of the RAM of server 104. In other embodiments, buffer pool 114 may be a circular buffer. For example, buffer pool 114 may contain data in a rolling block of memory, which wraps around to the beginning of the block when the data being written reaches the end of the block.

Log buffer header 116 may be an event log header, containing supplemental data about an event log, at the beginning of a buffer pool, such as buffer pool 114. In some embodiments, log buffer header 116 may include an eye catcher field. For example, log buffer header 116 may contain a searchable eye catcher string of "LOGH," which indicates where buffer pool 114 begins on the RAM of server 104. In other embodiments, log buffer header 116 may include a start pointer, which indicates where event log 118 begins. In still other embodiments, log buffer header 116 may include an end pointer, which indicates where event log 118 ends. In yet other embodiments, log buffer header 116 may include a wrap indicator, which indicates whether event log 118 has wrapped from the end of buffer pool 114 to the beginning of buffer pool 114.

Event log 118 may be a collection of log entries, which contain information from an event logger, such as event logger 112. For example, event logger 112 may write error, warning, debug, and trace information to event log 118. In some embodiments, event log 118 may contain a trailer, which indicates where the information contained in event log 118 ends. For example, event log 118 may contain a searchable trailer string of "<TAIL_OF_EVENTS>" following the end of the information in event log 118. In other embodiments, event log 118 may contain multiple discrete event log entries. For example, each event log entry may contain information regarding a single event, and a separate event log entry may contain information regarding each subsequent event.

In some embodiments, each event log entry in event log 118 may contain an event log entry header containing supplemental information. For example, each event log entry may contain size information, an entry identifier, and a log type. In other embodiments, each event log entry header may contain an eye catcher field, which indicates the start of a log entry. For example, an event log entry header could contain the string "LOG." In still other embodiments, each event log entry header may contain a dispatched field, which indicates whether the event log entry has been dispatched to management software, such as management software 120. In yet other embodiments, recovery application 110 may erase an event log entry that has been dispatched to management software, such as management software 120.

Management software 120 may be a software-based application, operating on a computer system, such as client device 106, for retrieving and storing event log entries from an event log, such as event log 118. For example, management software 120 may retrieve event log entries from event log 118 on server 104 via network 102. In some embodiments, management software 120 may enable a user to send commands to recovery application 110 via network 102.

Figure 2:
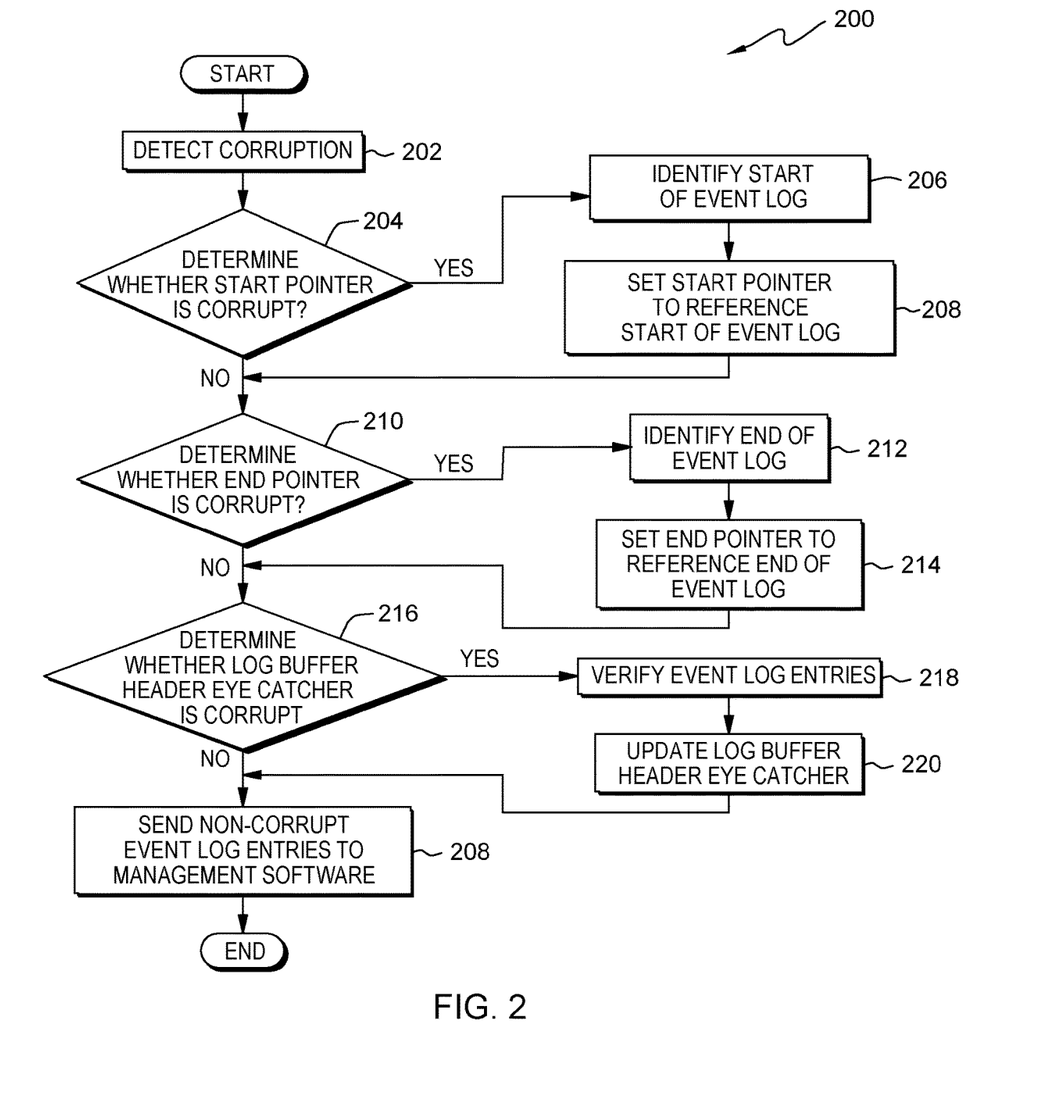
FIG. 2 is a flowchart depicting operational steps of a recovery application, such as the recovery application of FIG. 1, in accordance with an embodiment of the present invention.

FIG. 2 is a flowchart, generally designated 200, depicting operational steps of recovery application 110, in accordance with an embodiment of the present invention. The operational steps are in an order according to some embodiments. In other embodiments, the functions noted in the flowchart can occur out of the order noted in FIG. 2. Modifications to the depicted order may be made by those skilled in the art without departing from the scope of the invention as recited by the claims.

Recovery application 110 detects corruption (202). Recovery application 110 may detect corruption by monitoring requests to access buffer pool 114. For example, recovery application 110 may monitor any requests to read or write to buffer pool 114, and recovery application 110 may detect corruption upon detecting a failed attempt to read or write to buffer pool 114. In another example, recovery application 110 may monitor any requests to read an eye catcher in log buffer header 116, and recovery application 110 may detect corruption where the attempt to read the eye catcher fails.

Recovery application 110 determines whether a start pointer is corrupt (204). Recovery application 110 may determine whether a start pointer is corrupt by attempting to read the start pointer and attempting to access the referenced memory address. For example, where an attempt to read a start pointer fails, recovery application 110 may determine that the start pointer contained in log buffer header 116 is corrupt. In another example, where a start pointer references a memory address that is outside event log 118, recovery application 110 may determine that the start pointer is corrupt. In still another example, where a start pointer references a memory address that is not the start of an event log entry, recovery application 110 may determine that the start pointer is corrupt. In yet another example, where a start pointer references a memory address that contains an event log entry that has already been dispatched to management software 120, recovery application 110 may determine that the start pointer is corrupt. In another example, where a start pointer is readable and references a memory address that is the start of an event log entry that has not been dispatched, recovery application 110 may determine that the start pointer is not corrupt.

Responsive to a determination that a start pointer is not corrupt ("NO" branch 204), recovery application 110 determines whether end pointer is corrupt (210), as described below.

Responsive to a determination that a start pointer is corrupt ("YES" branch 204), recovery application 110 identifies the start of an event log (206). Recovery application 110 may identify the start of an event log, such as event log 118, by identifying an event log entry that is not corrupt and has not yet dispatched to management software, such as management software 120. For example, recovery application 110 may scan event log 118 for an initial event log entry with a readable header with a dispatched field that indicates the event log entry has not been dispatched. In some embodiments, recovery application 110 may identify the first non-corrupt event log entry that has not been dispatched.

In some embodiments, recovery application 110 may start locating event log entries from the beginning of a buffer pool. In other embodiments, where a log buffer header indicates that an end pointer has wrapped to the beginning of a buffer pool, recovery application 110 may start locating event log entries from the end pointer. For example, where log buffer header 116 indicates that an end pointer has wrapped around to the beginning of buffer pool 114, recovery application 110 may begin scanning for event log entries in the memory addresses immediately following the address referenced by the end pointer. In another example, where log buffer header 116 indicates an end pointer has wrapped, recovery application 110 may begin scanning for event log entries at a trailer.

Recovery application 110 sets a start pointer to reference the start of an event log (208). Recovery application 110 may set a start pointer to reference the start of an event log by erasing a corrupt start pointer and writing a start pointer that references the beginning of the identified initial event log entry. For example, recovery application 110 may overwrite the start pointer in log buffer header 116 to reference the beginning of the first non-corrupt event log entry that has not been dispatched to management software 120.

Recovery application 110 determines whether an end pointer is corrupt (210). Recovery application 110 may determine whether an end pointer is corrupt by attempting to read the end pointer and attempting to access the referenced memory address. For example, recovery application 110 may determine that the end pointer is corrupt where the end pointer is unreadable, where the end pointer references a memory address outside event log 118, or where the end pointer references a memory address that contains a corrupt memory block. In another example, where an end pointer references a memory address that is not the end of an event log entry, recovery application 110 may determine that the end pointer is corrupt. In yet another example, where an end pointer references a memory address that is not the location of a trailer, such as trailer string "<TAIL_OF_EVENTS>", recovery application 110 may determine that the end pointer is corrupt. In another example, where an end pointer is readable and references a memory address that contains a trailer, recovery application 110 may determine that the end pointer is not corrupt.

Responsive to a determination that an end pointer is not corrupt ("NO" branch 210), recovery application 110 determines whether a log buffer header eye catcher is corrupt (216), as described below.

Responsive to a determination that an end pointer is corrupt ("YES" branch 210), recovery application 110 identifies the end of an event log (212). Recovery application 110 may identify the end of an event log, such as event log 118, by locating a trailer string within the event log. For example, recovery application 110 may scan event log 118 for a trailer string of "<TAIL_OF_EVENTS>".

In some embodiments, where recovery application 110 cannot locate or cannot read a trailer, recovery application 110 may identify the end of an event log, such as event log 118, by locating a final event log entry within the event log. For example, recovery application 110 may identify a final event log entry that is not corrupt and that has not been dispatched to management software 120. In other embodiments, recovery application 110 may write a non-corrupt trailer to an event log, such as event log 118. For example, recovery application 110 may write a non-corrupt trailer string of "<TAIL_OF_EVENTS>" to a memory block following the final event log entry.

Recovery application 110 sets an end pointer to reference the end of an event log (214). Recovery application 110 may set an end pointer to reference the end of an event log by erasing a corrupt end pointer and writing an end pointer that references the beginning of the trailer. For example, recovery application 110 may overwrite the end pointer in log buffer header 116 to reference the beginning of the identified trailer string of "<TAIL_OF_EVENTS>".

Recovery application 110 determines whether a log buffer header eye catcher is corrupt (216). Recovery application 110 determines whether a log buffer header eye catcher is corrupt by attempting to read the eye catcher contained in the log buffer header. For example, where an attempt to read an eye catcher in log buffer header 116 fails, recovery application 110 may determine that the eye catcher in log buffer header 116 is corrupt. In another example, where an eye catcher is readable but does not contain a predetermined eye catcher string, such as "LOGH," recovery application 110 may determine that the eye catcher is corrupt. In still another example, where recovery application detected corruption (202) by monitoring a failed attempt to access an eye catcher, recovery application 110 may determine that the eye catcher is corrupt. In yet another example, where an eye catcher is readable and contains a predetermined eye catcher string, recovery application 110 may determine that the eye catcher is not corrupt. In some embodiments, where an eye catcher is corrupt, recovery application 110 may verify event log entries to determine whether further corruption is present.

Responsive to a determination that a log buffer header eye catcher is not corrupt ("NO" branch 216), recovery application 110 sends non-corrupt entries to management software (222), as described below.

Responsive to a determination that a log buffer header eye catcher is corrupt ("YES" branch 216), recovery application 110 verifies event log entries (218). Recovery application 110 may verify event log entries by reading the size of each event log entry in the corresponding event log entry header and matching the size in the header to the actual length of the event log entry. For example, recovery application 110 may read a size of 10 kilobytes (KB) in an event log entry header, and recovery application 110 may read the memory block 10 KB past the event log entry header, verifying that the block contains the beginning of the next event log entry. In some embodiments, where the size in the event log entry does not match the actual length of the event log entry, recovery application 110 may determine that the event log entry is corrupt. In other embodiments, where an event log entry is corrupt, recovery application 110 may erase the event log entry.

Recovery application 110 updates a log buffer header eye catcher (220). Recovery application 110 may update a log buffer header eye catcher by erasing a corrupt eye catcher and writing an eye catcher string. For example, recovery application 110 may erase a corrupt eye catcher contained in log buffer header 116, and recovery application 110 may write an eye catcher string of "LOGH" to log buffer header 116.

Recovery application 110 sends non-corrupt event log entries to management software (222). Recovery application 110 may send non-corrupt event log entries to management software, such as management software 120, by presenting recovered entries to the management software. For example, recovery application 110 may present recovered non-corrupt event log entries, which are contained in event log 118, to management software 120 on client device 106 via network 102. In another example, recovery application 110 may present the initial event log entry, which is referenced by the start pointer, and present each subsequent recovered event log entry until presenting the final event log entry, which is referenced by the end pointer. In some embodiments, recovery application 110 may update the start pointer, responsive to presenting recovered event log entries to management software, such as management software 120. For example, responsive to presenting recovered event log entries to management software 120, recovery application 110 may set the start pointer to reference a memory address following the final event log entry.

Figure 3:
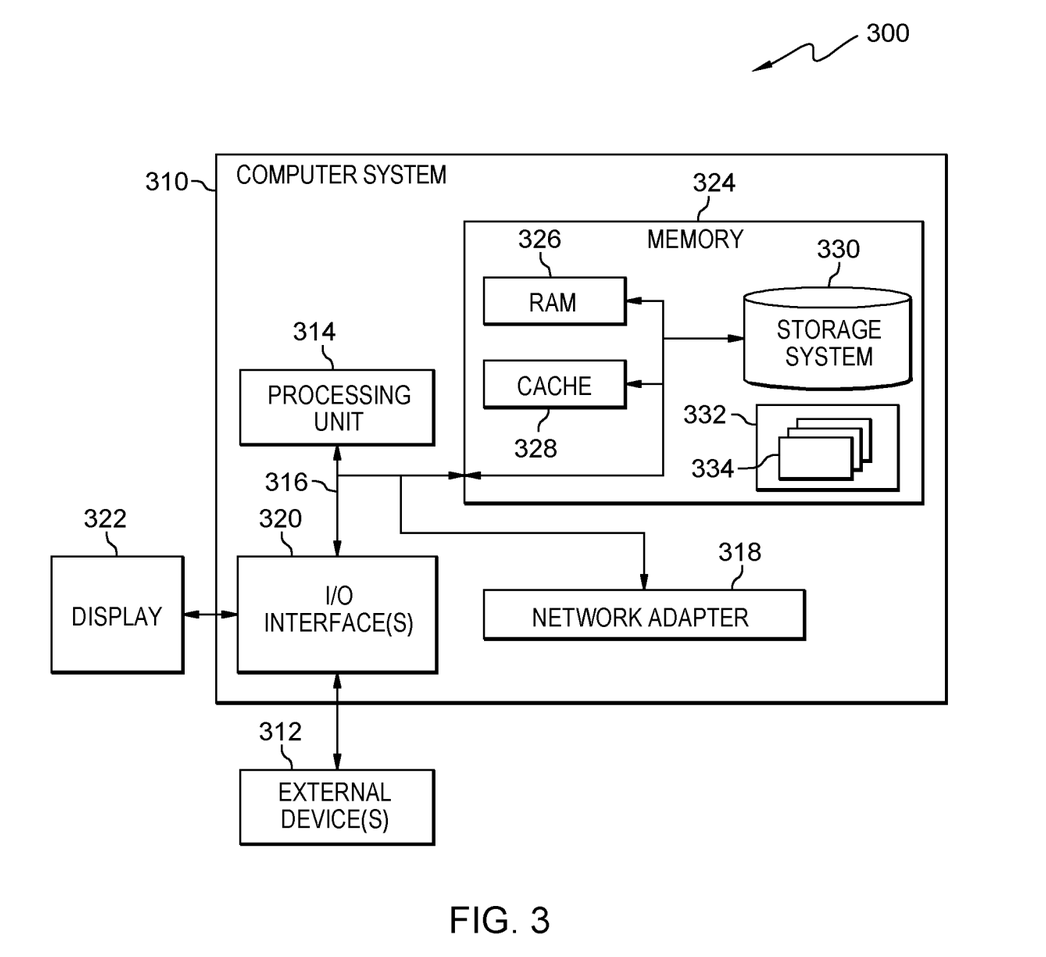
FIG. 3 depicts a block diagram of components of a computer system capable of executing a recovery application, such as the server of FIG. 1, in accordance with an embodiment of the present invention.

FIG. 3 depicts a block diagram, generally designated 300, of components of computer system capable of executing recovery application 110, such as server 104, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in distributed data processing environment 100 is shown in the form of a general-purpose computing device, such as computer system 310. The components of computer system 310 may include, but are not limited to, one or more processors or processing unit 314, memory 324, and bus 316 that couples various system components including memory 324 to processing unit 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computer operated by a user, partly on the user-operated computer, as a stand-alone software package, partly on the user-operated computer and partly on a remote computer or entirely on the remote computer or server. In the latter scenario, the remote computer may be connected to the user-operated computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method comprising:
   determining that a start pointer in a log buffer header of an event log is corrupt;
   recovering the start pointer, wherein the start pointer references an initial entry in the event log;
   determining that an end pointer in the log buffer header of the event log is corrupt;
   recovering the end pointer, wherein the end pointer references a final entry in the event log; and
   presenting recovered entries in the event log to a user, wherein the recovered entries are located between the start pointer and the end pointer.

2. The method of claim 1, wherein recovering the start pointer further comprises:
   identifying the initial entry in the event log, wherein the initial entry is not corrupt; and writing a non-corrupt start pointer, wherein the non-corrupt start pointer references the initial entry.

3. The method of claim 1, wherein recovering the end pointer further comprises:
identifying the final entry in the event log, wherein the final entry is not corrupt; and
writing a non-corrupt end pointer, wherein the non-corrupt end pointer references the final entry.

4. The method of claim 1, wherein presenting the recovered entries in the event log to the user further comprises:
identifying non-corrupt entries in the event log; and
presenting the non-corrupt entries to the user.

5. The method of claim 1, further comprising:
determining whether an eye catcher in the log buffer header is corrupt; and
recovering the eye catcher.

6. The method of claim 5, wherein recovering the eye catcher further comprises:
verifying an entry in the event log; and
writing a non-corrupt eye catcher.

7. A computer program product comprising a computer readable storage media having stored thereon:
program instructions to determine that a start pointer in a log buffer header of an event log is corrupt;
program instructions to recover the start pointer, wherein the start pointer references an initial entry in the even log;
program instructions to determine that an end pointer in the log buffer header of the event log is corrupt;
program instructions to recover the end pointer, wherein the end pointer references a final entry in the event log; and
program instructions to present recovered entries in the event log to a user, wherein the recovered entries are located between the start pointer and the end pointer.

8. The computer program product of claim 7, wherein the program instructions to recover the start pointer further comprise:
program instructions to identify the initial entry in the event log, wherein the initial entry is not corrupt; and
program instructions to write a non-corrupt start pointer, wherein the non-corrupt start pointer references the initial entry.

9. The computer program product of claim 7, wherein the program instructions to recover the end pointer further comprises:
program instructions to identify the final entry in the event log, wherein the final entry is not corrupt; and
program instructions to write a non-corrupt end pointer, wherein the non-corrupt end pointer references the final entry.

10. The computer program product of claim 7, wherein the program instructions to present the recovered entries in the event log to the user further comprises:
program instructions to identify non-corrupt entries in the event log; and
program instructions to present the non-corrupt entries to the user.

11. The computer program product of claim 7, further comprising:
program instructions to determine whether an eye catcher in the log buffer header is corrupt; and
program instructions to recover the eye catcher.

12. The computer program product of claim 11, wherein the program instructions to recover the eye catcher further comprise:
program instructions to verify an entry in the event log; and
program instructions to write a non-corrupt eye catcher.

13. A computer system comprising:
a processor set; and
a computer readable storage media;
wherein:
the processor set is structured, located, connected, and/or programmed to execute program instructions stored on the computer readable storage media; and
the program instructions include:
program instructions to determine that a start pointer in a log buffer header of an event log is corrupt;
program instructions to recover the start pointer, wherein the start pointer references an initial entry in the even log;
program instructions to determine that an end pointer in the log buffer header of the event log is corrupt;
program instructions to recover the end pointer, wherein the end pointer references a final entry in the event log; and
program instructions to present recovered entries in the event log to a user, wherein the recovered entries are located between the start pointer and the end pointer.

14. The computer system of claim 13, wherein the program instructions to recover the start pointer further comprise:
program instructions to identify the initial entry in the event log, wherein the initial entry is not corrupt; and
program instructions to write a non-corrupt start pointer, wherein the non-corrupt start pointer references the initial entry.

15. The computer system of claim 13, wherein the program instructions to recover the end pointer further comprises:
program instructions to identify the final entry in the event log, wherein the final entry is not corrupt; and
program instructions to write a non-corrupt end pointer, wherein the non-corrupt end pointer references the final entry.

16. The computer system of claim 13, wherein the program instructions to present the recovered entries in the event log to the user further comprises:
program instructions to identify non-corrupt entries in the event log; and
program instructions to present the non-corrupt entries to the user.

17. The computer system of claim 13, further comprising:
program instructions to determine whether an eye catcher in the log buffer header is corrupt; and
program instructions to recover the eye catcher.

18. The computer program product of claim 17, wherein the program instructions to recover the eye catcher further comprise:
program instructions to verify an entry in the event log; and
program instructions to write a non-corrupt eye catcher.

* * * * *